A. R. LINDBLAD.
METHOD FOR SYNTHETIC PRODUCTION OF CYANOGEN COMPOUNDS.
APPLICATION FILED NOV. 18, 1914.
1,186,921.
Patented June 13, 1916.
3 SHEETS—SHEET 1.
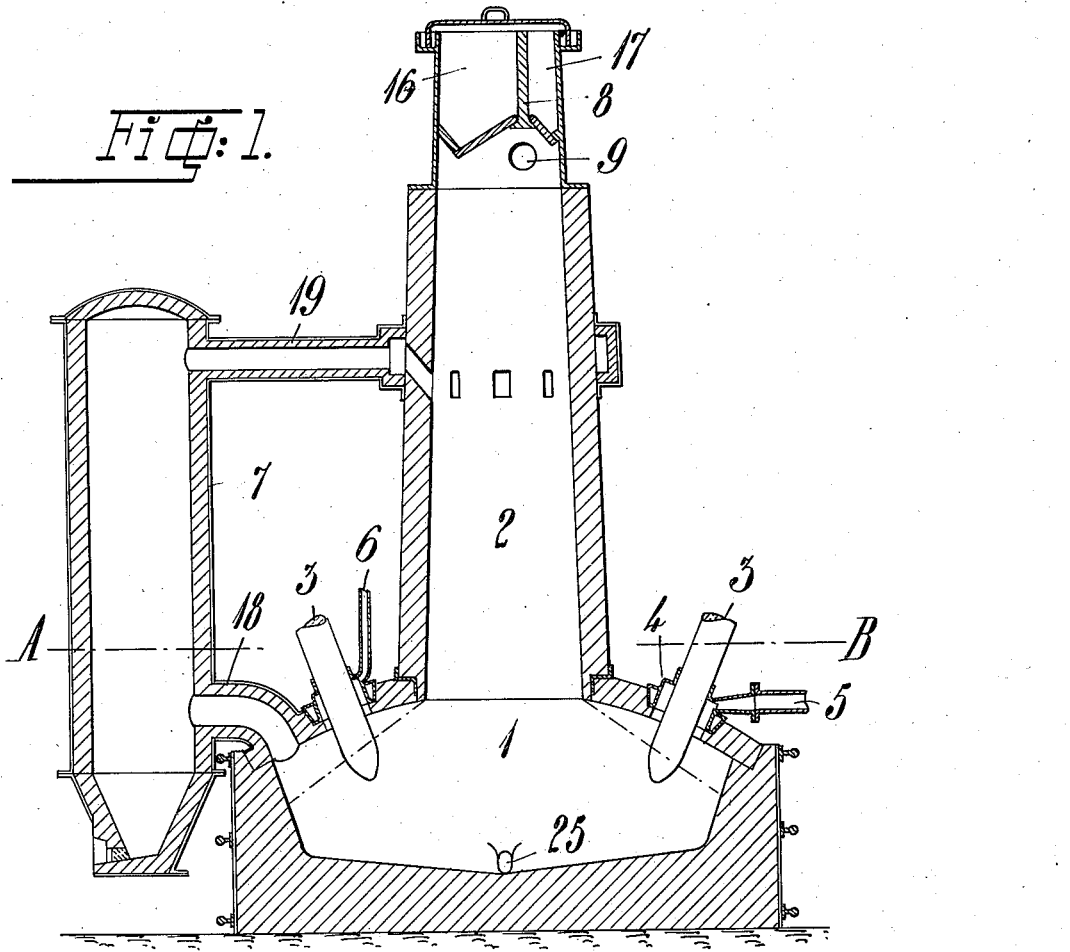
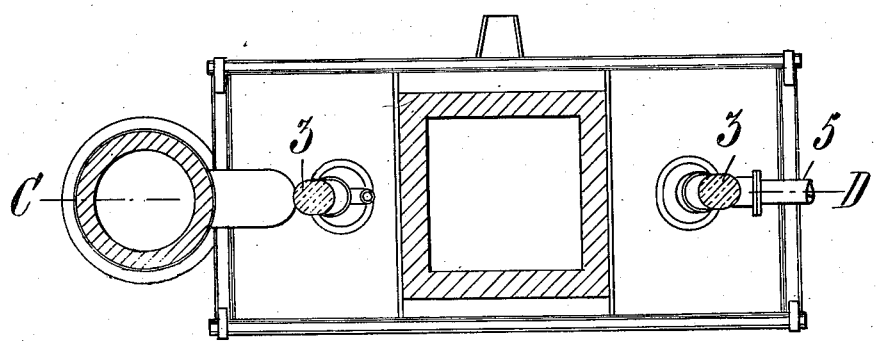

A. R. LINDBLAD.
METHOD FOR SYNTHETIC PRODUCTION OF CYANOGEN COMPOUNDS.
APPLICATION FILED NOV. 18, 1914.
1,186,921.
Patented June 13, 1916.
3 SHEETS—SHEET 2.
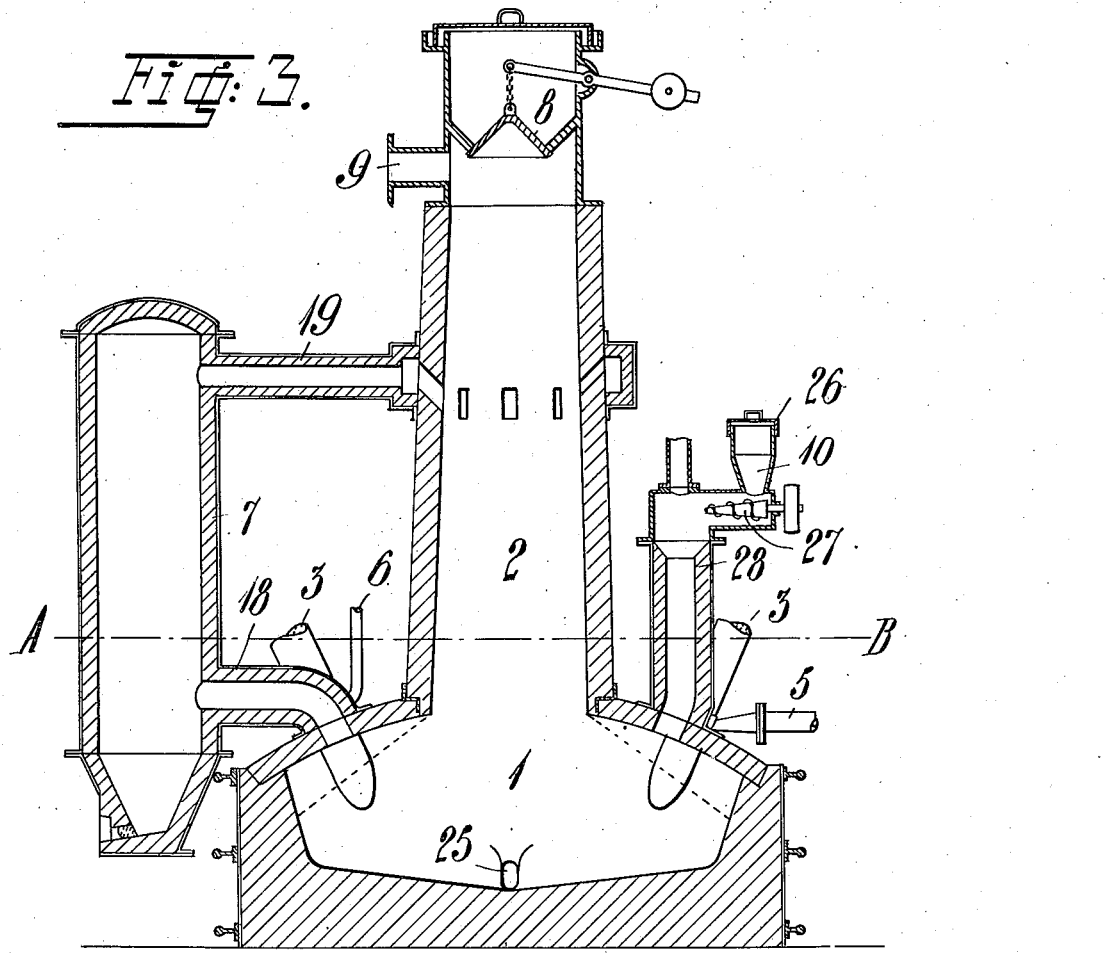
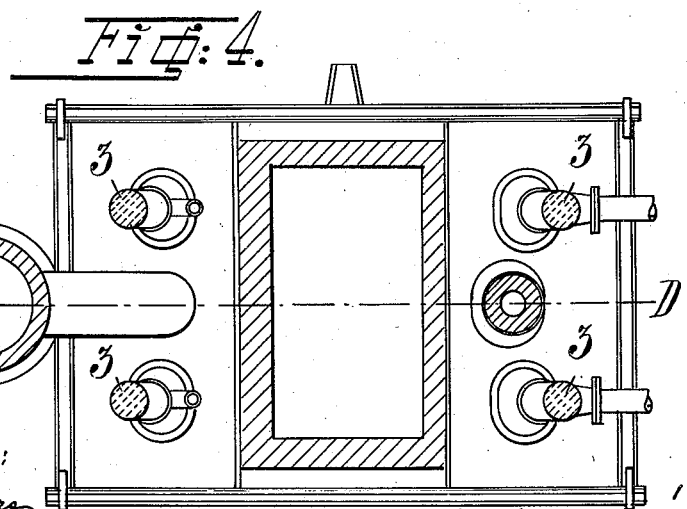

A. R. LINDBLAD.
METHOD FOR SYNTHETIC PRODUCTION OF CYANOGEN COMPOUNDS.
APPLICATION FILED NOV. 18, 1914.
1,186,921.
Patented June 13, 1916.
3 SHEETS—SHEET 3.
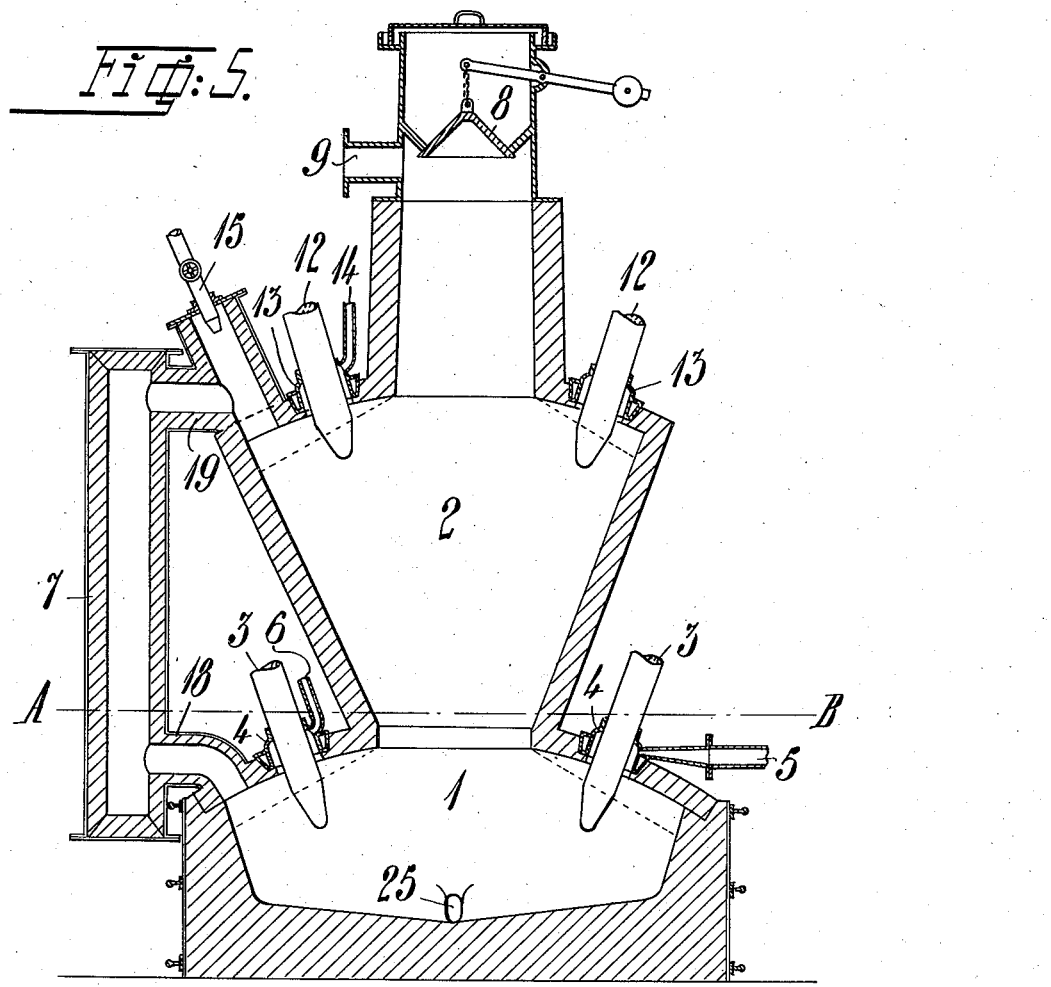
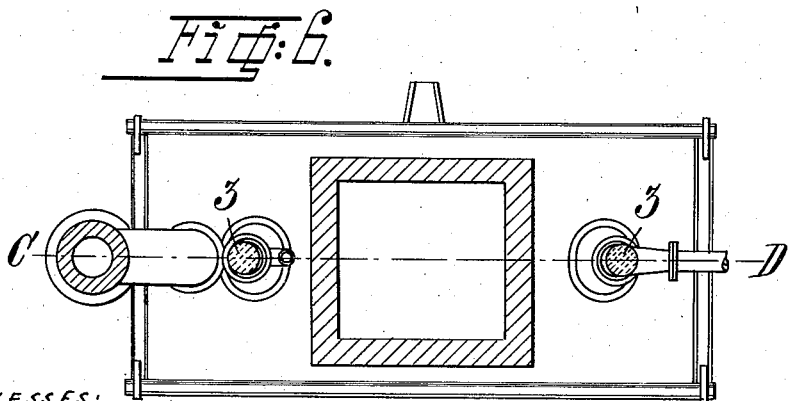

UNITED STATES PATENT OFFICE.

AXEL RUDOLF LINDBLAD, OF LUDVIKA, SWEDEN.

METHOD FOR SYNTHETIC PRODUCTION OF CYANOGEN COMPOUNDS.

1,186,921.   Specification of Letters Patent.   Patented June 13, 1916.

Application filed November 18, 1914. Serial No. 872,717.

*To all whom it may concern:*

Be it known that I, AXEL RUDOLF LINDBLAD, engineer, subject of the King of Sweden, residing at Ludvika, in the Kingdom of Sweden, have invented certain new and useful Improvements in Methods for Synthetic Production of Cyanogen Compounds, of which the following is a specification.

The present invention has for its object methods for synthetic production of cyanogen compounds or of other compounds which may be obtained through decomposition of cyanogen compounds for instance ammonia.

The characteristic features of the present new method are that the reactions are carried out in an electric furnace, which internally is given such a form that the charge at one or several places gets opportunity to fall down and form free surfaces in such a way, that one or several free spaces always are formed between the material falling down and the brickwork of the furnace, besides which the electrodes or some of them are put in contact with the material being treated at such places, where the material does not press against the brickwork. Hereby several advantages are gained with regard as well to the supply of electric current as to the supply of gases necessary for the process, removing of products formed et cetera. These advantages are of so great an importance, that thereby a synthetic production of cyanogen compounds in continual work is rendered possible, which, as known, hitherto has been considered a very difficult problem to solve.

In order to make the invention more clear there is shown on the accompanying drawing as example some different forms of electric furnaces intended for carrying out the method.

Figure 1 shows a furnace in vertical section along the line C—D in Fig. 2, and Fig. 2 shows the same furnace in horizontal section along the line A—B in Fig. 1. Figs. 3 and 4 show in analogous way a somewhat modified form of the furnace. Figs. 5 and 6 finally show in the same way a furnace, intended for synthetic production of ammonia, whereby cyanogen compounds are formed as an intermediate product.

In the different figures corresponding parts are indicated with the same numbers of reference.

The invention is first described with regard to Figs. 1 and 2. 1 is the smelting chamber proper, upon which a shaft 2 is arranged in communication with said chamber. 3 are electrodes for supplying the electric energy to the material in the smelting chamber. Where the electrodes pass the brickwork, they are surrounded by water-cooled frames 4. Through the pipes 5, 6 gases may be blown into the smelting chamber around the electrodes. 7 indicates schematically a condenser for the gases formed, in the process. 8 is a charging device of usual construction and 9 is an outlet for gases.

In Fig. 3, 10 indicates a charging device by means of which a part of the raw material can be separately charged into the smelting chamber.

According to Figs. 5 and 6 which as above stated, show a furnace intended for the production of ammonia, there is also a pair of electrodes 12 provided at the top part of the furnace, said electrodes being surrounded with frames 13 adapted to be cooled by water or the like. Gases may be supplied through the pipe 14, and steam may be introduced through the jet 15.

As an example on the carrying out of the process with use of this system of furnace, I will first describe the manufacture of potassiumcyanid, KCN. As raw material potassium carbonate $K_2CO_3$ or potassium hydroxid KOH may be used. The carbon preferably ought to be supplied in the form of charcoal, although other kinds of carbon also may be used, and the nitrogen or azotic gas ought to be tolerably pure and may be manufactured in the simplest manner by means of fractional distillation of liquid air. The charcoal and the potassium compound are, by means of the charging device 8 introduced in the upper part of the shaft. It is thereby suitable to charge the potassium compound at that side of the furnace, where the nitrogen is blown into the furnace chamber. For this reason the charging device is, according to Fig. 1 divided into two chambers, viz. a larger one 16 for the charge of charcoal and a smaller one 17 for the charge of potassium compound. Electric energy necessary for the carrying out of the reactions is supplied by means of the electrodes 3. These electrodes are put into contact with the charge at places, where the charge does not press against the inner walls or valves of the furnace chamber. Thereby the current is prevented from flowing through the brickwork of the furnace, which, at the temperature, prevailing in the furnace, becomes a conductor for the electric current. Nitrogen, preferably in excess, is supplied through the jet 5, opening into an annular chamber or space, surrounding the electrode, which annular chamber communicates with the free space formed between the free surface of the charge sinking down into the furnace chamber and the brickwork of said furnace chamber or through other openings arranged close to the electrodes. In the free space the gas has opportunity to spread itself over a large place and consequently to be quickly heated, and as uniformly as possible to come into contact with as great a part as possible of the charge. The blowing in of the gas around the electrodes is useful because the electrodes thereby are cooled, without that this cooling causing any loss of energy. If, by means of the electric current, the temperature is kept sufficiently high in the furnace chamber, the reaction—potassium carbonate being supposed to be used—is going on, substantially according to the formula:

$$K_2CO_3 + 4CO + 2N = 2KCN + 3CO.$$

It is preferable, though by no means necessary, to raise the temperature so high, that the cyanid is gasified. This involves however the disadvantage that also a part of the potassium carbonate is volatilized; but if the potassium carbonate is charged at the one side of the furnace as above described, said volatilized potassium carbonate has to pass a comparatively long way through only glowing carbon and thereby it comes in reaction with the carbon and with the nitrogen passing through the furnace. Under such circumstances only a small part of the potassium carbonate will leave the furnace in a not decomposed condition, wherefore no great disadvantages will arise from the evaporation of the carbonate. The cyanid mixed with CO and a small part of other gases is led off from the furnace through the conduit 18 into a condenser 7, where it is condensed and collected. The gases not condensed may be removed directly from the condenser or also, as shown on the drawing, be reintroduced into the furnace shaft through the conduit 19. The last named manner is generally to be preferred, as the escaping gases always contain some cyanid, either uncondensed or in the form of a fine powder. Besides also some other cyanogen compounds, condensable only at a low temperature, may occur among the products obtained. A separation of these condensable materials can take place at their passing through the cold charge, whereafter they accompany the charge down to the warmer parts of the furnace. The ash of the charcoal and other foreign ingredients eventually present may form slag, which is in usual manner discharged through tap-holes 25 at the bottom of the furnace.

In order to prevent condensation of gases in the spaces between the electrodes and the watercooled frames surrounding them a small amount of some suitable gas for instance gas escaping from the furnace and of suitable temperature may be introduced at the electrodes, where supply of nitrogen does not take place. It is important, that no condensation takes place between the electrodes and the cooling frame surrounding them as otherwise a caking of condensed products may take place, which render the regulation of the electrodes difficult.

Under certain circumstances it ought to be advantageous to feed the potassium compound directly into the free space, for instance through the feeding apparatus 10, arranged for this purpose, see Fig. 3, which apparatus consists of a hopper 26, a feeding screw 27 and a pipe 28 opening into the furnace chamber. In the same way as the process has been above described for the production of potassium cyanid, it can also be carried out for the production of several other cyanids, especially in the production of sodium cyanid, which is nearly related to the potassium cyanid. In the production of barium cyanogen compounds certain modifications however may be made, conditioned thereby, that the barium compounds, which may serve as raw material, have a much higher smelting point than for instance corresponding potassium or sodium compounds.

In the foregoing the process has been described under the supposition, that the cyanogen compounds themselves formed final products. The process can also be used in cases, when these compounds only form an intermediate product, for instance in the synthesis of ammonia. As known a great part of the cyanogen compounds is decomposed when treated with steam whereby they give off of their nitrogen in the form of $NH_3$. In the following is described as an example such an ammonia-synthesis in connection with the above described method for production of cyanogen compounds and in this example it is supposed, that the raw material is potassium hydrate.

In the furnace there is first formed cyanid as above described according to the formula:

$$KOH + 2C + N = KCN + CO + H.$$

The cyanid formed is led off in gaseous condition from the furnace chamber 1 through the conduit 18 and is reintroduced into the shaft at a higher level through the conduit 7 (which in this case is not constructed as a condenser) and the pipe 19 (see Figs. 5 and 6) for instance in the free spaces around the electrodes 12, where it meets with water-steam, being blown in through the jet 15 and is there decomposed according to the formula:

$$KCN + 2H_2O = KOH + NH_3 + CO.$$

Thus the products of the reaction are re-introduced into the furnace system, and the potassium hydrate thereby formed together with the carbon charged into the furnace is permitted to sink down to the warmer parts of the furnace, while the gases are led off at the top through the conduit 9, whereby ammonia in suitable way is collected or utilized. Potassium hydrate thus goes in a cyclical process, and need not again be supplied in greater quantity than is necessary to repair losses thereof.

The reaction shown in the above formula, is endothermic. In order to generate the quantity of heat necessary electric energy may be supplied by means of the electrodes 12.

Synthetic production of ammonia with the use of cyanogen compounds as an intermediate product has often been proposed and tried, but has always failed, as far as a production in economic manner has been concerned. This depends to a great extent on the unsuitable form given to the furnace and to the apparatuses, being used in the carrying out of the processes and the unsuitable manner, in which the different arrangements have been combined with each other. The peculiar properties of the cyanogen compounds in physical as well as in chemical respects must strictly be taken into consideration, and the combination of the apparatus must be suited with regard thereto for obtaining a good result.

Having thus described my invention I declare that what I claim is:

1. A process for the production of cyanogen compounds consisting in charging one part of the material used for the process into a melting chamber of an electric furnace to allow the charge to spread as it sinks into the said chamber so that sloping surfaces are presented between which and the adjacent chamber walls free spaces are provided, heating the charge by means of electric current supplied to the charge at said sloping surfaces, introducing gaseous nitrogen into the melting chamber, and feeding another part of the material used for the process directly into the said free spaces.

2. A process for the production of cyanogen compounds consisting in feeding the charge of material used for the process downwardly into a melting chamber of an electric furnace, causing the charge to spread as it sinks to form sloping surfaces and to provide spaces between said surfaces and the adjacent chamber walls, heating the charge by means of electric current supplied to the charge at said sloping surfaces, introducing gaseous nitrogen into the melting chamber at the points of electric supply, and re-introducing gas escaping from the furnace into the latter from other points.

3. A process for the production of cyanogen compounds consisting in feeding the charge and material used for the process downwardly into a melting chamber of an electric furnace, causing the charge to spread as it sinks to form sloping surfaces and free spaces between the same and the adjacent chamber walls, heating the charge by means of electric current supplied to the charge at said sloping surfaces at the free spaces, introducing gaseous nitrogen into the melting chamber, maintaining the temperature in the furnace so high that the cyanogen compounds formed escape as gases, leading these gases into condensing apparatus, condensing the cyanogen compounds, and re-introducing the uncondensed portion of the gases into the furnace.

4. A process for the production of cyanogen compounds consisting in feeding a charge of carbon and metal compounds downwardly to a melting chamber of an electric furnace, causing the charge to spread as it sinks to form sloping surfaces and free spaces between the same and the adjacent chamber walls, heating the charge by means of electric current supplied to the charge at said sloping surfaces, and introducing gaseous nitrogen into the melting chamber, the metal compounds used as raw material being charged into the furnace in such a way that the greatest possible part of the same sinks down into the melting chamber at the place where the nitrogen is introduced.

5. A process for the production of cyanogen compounds consisting in feeding the charge into a melting chamber of an electric furnace in a downward direction, causing the charge to spread as it sinks to form outwardly sloping surfaces, free spaces being afforded between said surfaces and the adjacent furnace walls, heating the charge by means of electric current supplied to the charge at said sloping surfaces at said free spaces, and introducing gaseous nitrogen into the melting chamber.

6. A process for the production of cyanogen compounds consisting in feeding the charge into a melting chamber of an electric furnace in a downward direction, causing the charge to spread as it sinks to form outwardly sloping surfaces, free spaces being afforded between said surfaces and the adjacent furnace walls, heating the charge by means of electric current supplied to the charge at said sloping surfaces at said free spaces, and introducing gaseous nitrogen into the melting chamber close to the points of supply of electric current to the charge.

7. A process for the production of cyanogen compounds consisting in feeding the charge into a melting chamber of an electric furnace in a downward direction, causing the charge to spread as it sinks to form outwardly sloping surfaces, heating the charge by means of electric current supplied to the charge at said sloping surfaces, introducing gaseous nitrogen into the melting chamber, maintaining the temperature in the furnace so high that the cyanogen compounds formed escape in the form of gases, and leading said gases into condensing apparatus.

In witness whereof I have hereunto set my hand in presence of two witnesses.

AXEL RUDOLF LINDBLAD.

Witnesses:
AUG. HAGELIN,
ALINA PETTERSSEN.